United States Patent
Slawinski

(10) Patent No.: US 12,386,965 B1
(45) Date of Patent: Aug. 12, 2025

(54) ENTROPY-BASED PREEMPTIVE FALSE POSITIVE MITIGATION

(71) Applicant: CrowdStrike, Inc., Sunnyvale, CA (US)

(72) Inventor: Michael Slawinski, Rancho Santa Margarita, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/812,897

(22) Filed: Aug. 22, 2024

(51) Int. Cl.
  *G06F 21/56* (2013.01)
  *G06F 18/21* (2023.01)
  *G06N 20/00* (2019.01)

(52) U.S. Cl.
  CPC ............ *G06F 21/566* (2013.01); *G06F 18/21* (2023.01); *G06F 2221/034* (2013.01); *G06N 20/00* (2019.01)

(58) Field of Classification Search
  CPC ........ G06F 21/566; G06F 18/21; G06N 20/00
  See application file for complete search history.

(56) References Cited

U.S. PATENT DOCUMENTS

2023/0131525 A1* 4/2023 Šopik ............... G06F 21/561
  726/1

OTHER PUBLICATIONS

Kostopoulos, Nikos, et al. "SHAP interpretations of tree and neural network DNS classifiers for analyzing DGA family characteristics " IEEE Access 11 (2023): 61144-61160.1. (Year: 2023).*
Rajesh Kumar et al., "Effective Malware Detection using Shapely Boosting Algorithm", (IJACSA) International Journal of Advanced Computer Science and Applications, vol. 13, No. 1, 2022, pp. 101-111.
R. S. Lopes et al., "False Positive Identification in Intrusion Detection Using XAI", IEEE Latin America Transactions, vol. 21, No. 6, Jun. 2023, pp. 745-751.
Fatemeh Afghah et al., "A Shapley Value Solution to Game Theoretic-based Feature Reduction in False Alarm Detection", arXiv:1512.01680v1 [cs.CV] Dec. 5, 2015, 5 pp. total.
Mohammad Zaeri-Amirani et al., "A Feature Selection Method Based on Shapley Value to False Alarm Reduction in ICUs, A Genetic-Algorithm Approach", arXiv:1804.11196v1 [eess.SP] Apr. 26, 2018, 6 pp. total.

* cited by examiner

*Primary Examiner* — Kevin W Figueroa
(74) *Attorney, Agent, or Firm* — Womble Bond Dickinson (US) LLP

(57) ABSTRACT

The present disclosure provides an approach of computing a plurality of feature attribution vectors from a plurality of samples. The approach determines a plurality of low entropy distribution samples from the plurality of samples based on the plurality of feature attribution vectors, and determines a feature value distribution corresponding to the plurality of low entropy distribution samples. Then, the approach identifies a false positive candidate sample based on the feature value distribution and, in turn, constructs a mitigation rule, based on the false positive candidate sample, to mitigate a future false positive sample.

18 Claims, 6 Drawing Sheets

ENTROPY-BASED PREEMPTIVE FALSE POSITIVE MITIGATION

TECHNICAL FIELD

Aspects of the present disclosure relate to cybersecurity, and more particularly, to an entropy-based preemptive false positive mitigation system.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats also encompass suspicious activities, such as unusual patterns of network traffic or unauthorized access attempts, which may indicate potential security breaches or weaknesses that need investigation and mitigation.

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities. As discussed herein, artificial intelligence models, or AI models, include machine learning models, large language models, and other types of models that are based on neural networks, genetic algorithms, expert systems, Bayesian networks, reinforcement learning, decision trees, or combination thereof.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
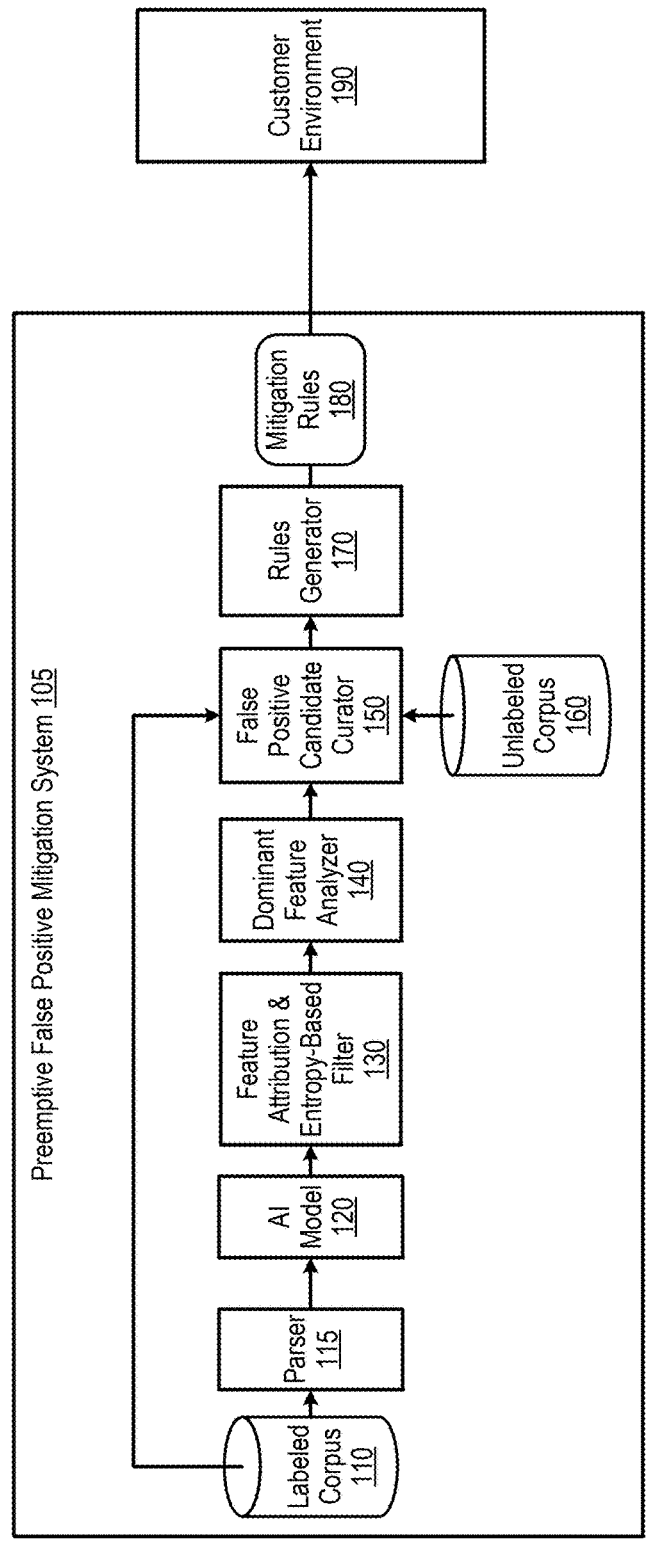
FIG. 1 is a block diagram that illustrates an example entropy-based preemptive false positive mitigation system, in accordance with some embodiments of the present disclosure.

AI models are used in cybersecurity applications to predict whether a file is benign or malicious by examining a wide array of features and patterns within the file's content and behavior. The process typically involves parsing the file to extract relevant features such as code signatures, metadata, file structure, and behavioral indicators. These features are then fed into the AI model, which has been trained on a vast dataset of labeled examples, including both benign and malicious files. Using this training, the AI model applies algorithms and techniques to identify patterns and correlations to distinguish between benign and malicious files. The AI model evaluates the extracted features against these learned patterns, assigning probabilities or scores that indicate the likelihood of the file being malicious. Based on these scores, the AI model makes a prediction and classifies the file as either benign or malicious.

Due to the complexity and variability of both benign and malicious files, the AI model may sometimes classify a legitimate file as dirty (malicious), resulting in a false positive. False positives can undermine the reliability of an AI model by causing unwarranted concern and resource allocation, and can disrupt normal operations by flagging legitimate activities as suspicious. For example, a benign software update may include code segments or behaviors that are similar to those found in malware, leading the AI model erroneously flagging the benign software update as a threat. Such false positives can disrupt business operations, cause unnecessary alarm, and require additional resources to investigate and resolve.

Furthermore, false positive "floods" may occur when a system generates an overwhelming number of incorrect alerts, mistakenly identifying benign or legitimate activities as threats, thereby inundating users with unnecessary warnings, and potentially obscuring genuine security issues. False positive floods may occur when the same benign file, or variants thereof, is repeatedly misclassified as malicious by the system, leading to a surge of incorrect alerts for that particular file.

A challenge found with training an AI model in regard to producing false positives is that the labeled corpus used to train the AI model may include substantially more dirty files relative to clean files. This imbalance leads to the AI model over emphasizing features of malicious files that also exist in benign files, resulting in a substantial risk of false positive incidents when each newly trained model is deployed to customer environments.

The present disclosure addresses the above-noted and other deficiencies using an entropy-based preemptive false positive mitigation system that generates mitigation rules to mitigate future customer false positives. In one embodiment, the present disclosure uses a processing device to provide a labeled corpus (labeled samples) into an AI model to produce predictions. The processing device determines dirty samples from the labeled samples and computes feature attribution vectors (e.g., Shapley vectors) of the dirty samples. The processing device then determines which of the dirty samples have feature attribution vectors with low entropy distribution (e.g., low entropy distribution of the feature attribution values in the feature attribution vectors). The processing device determines dominant features in the low entropy distribution samples based on the feature attribution vectors, and then determines dominant feature value distributions of the dominant features. Then, the processing device searches for clean samples from labeled samples that have feature values within the dominant feature value distributions and marks them as false positive candidate samples. In one embodiment, when more false positive candidate samples are required, the processing device searches an unlabeled corpus for unlabeled samples that have feature values within the dominant feature value distributions and adds them to the false positive candidate samples. In one embodiment, the processing device provides the mitigation rule to a customer system to mitigate the future false positive sample at the customer system.

As discussed herein, the present disclosure provides an approach that improves the operation of a computer system by preemptively mitigating customer false positives before instances are encountered at the customer environment. This proactive approach helps in mitigating the risk of false positive floods and enhances the reliability of newly trained models when deployed to endpoints. In addition, the present disclosure provides an improvement to the technological field of machine learning model validation and deployment by providing an approach to predict and mitigate false positives before they occur in real-world applications. This approach enhances AI model robustness and reliability, ensuring better performance and reducing the incidence of incorrect classifications that could adversely affect end users.

FIG. 1 is a block diagram that illustrates an example entropy-based preemptive false positive mitigation system, in accordance with some embodiments of the present disclosure. System 100 includes preemptive false positive mitigation system 105 and customer environment 190. In one embodiment, preemptive false positive mitigation system 105 may be part of a larger security detection system that detects and mitigates malware at customer environment 190.

As discussed herein, preemptive false positive mitigation system 105 constructs mitigation rules 180 without using false positives received from customer environment 190. Instead, as discussed below, preemptive false positive mitigation system 105 computes feature attribution vectors (e.g., Shapley vectors) and uses an entropy-based approach to select clean samples and use the clean samples to construct mitigation rules 180 that, in turn, are provided to customer environment 190.

Preemptive false positive mitigation system 105 includes parser 115, which parses labeled samples from labeled corpus 110 to produce feature vectors that include feature values for various features. Parser 115 feeds the feature vectors into AI model 120, which generates predictions for the labeled samples.

Feature attribution and entropy-based filter 130 perform feature attribution scoring on the labeled samples to generate feature attribution vectors that include feature attribution values. In one embodiment, feature attribution and entropy-based filter 130 compute Shapley vectors. A Shapley vector is a mathematical representation that quantifies the individual contribution of each feature to a model's prediction, based on a Shapley value concept from cooperative game theory. Shapley vectors are used to fairly attribute the contribution of each feature in AI model 120's prediction. Shapley values distribute the total gain generated by the coalition of all players (features) fairly. In the context of machine learning, a Shapley vector represents the impact of each feature on a particular prediction by calculating the average marginal contribution of that feature across all possible combinations of features.

In turn, feature attribution and entropy-based filter 130 uses the feature attribution vectors to determine which of the labeled samples have a low entropy distribution of feature attribution values. Entropy is a measure of the uncertainty in a distribution, and low entropy is when there is little uncertainty as to an outcome. As such, a low entropy distribution sample is one in which the distribution of feature attribution values is concentrated, indicating that a single feature predominantly influenced the AI model 120's decision (see FIGS. 2, 3, and corresponding text for further details). For example, a histogram may include a single dominant bar such that 99% of the probability mass is concentrated in a single feature. In this example, a corresponding feature attribution vector may be (0.0001, 0.00023, 0.995, 0.00467). Entropy is defined by—sum $p_i \log(p_i)$, where "$p\_i$" is the probability of the outcome "i." Therefore, the entropy of (0.0001, 0.00023, 0.995, 0.00467) is 0.032897.

Feature attribution and entropy-based filter 130 passes the low entropy distribution samples to dominant feature analyzer 140. Dominant feature analyzer 140 identifies dominant features in the feature attribution vectors corresponding to the low entropy distribution samples. For example, a feature attribution vector may include scores of Fa:0.7, Fb:0.1, Fc:0.1, and Fd:0.1. In this example, Fa is the dominant feature. In one embodiment, dominant feature analyzer 140 may use a preset threshold to determine whether a feature is dominant (e.g., greater than 0.5, 40% greater than other attribution values, etc.).

Dominant feature analyzer 140 then aggregates feature value vectors (from parser 115) corresponding to the low entropy distribution (dirty) samples to produce dominant feature value distributions. For example, if sample S1 has a feature value of 0.65 for feature Fa, and sample S2 has a feature value of 0.55 for feature Fa, then the dominate feature value distribution for feature Fa is 0.55-0.65. In turn, dominant feature analyzer 140 sends the dominant features and corresponding dominant feature value distributions to false positive candidate curator 150.

False positive candidate curator 150 searches for clean samples in labeled corpus 110 that have feature values within the dominant feature value distribution and mark them as false positive candidate samples. Continuing the example above, if a clean sample has a feature value for feature Fa between 0.55-0.7, the false positive candidate curator 150 marks the clean sample as a false positive candidate sample. In one embodiment, if more false positive candidate samples are required, false positive candidate curator 150 searches in unlabeled corpus 160 for unlabeled samples that have feature values within the dominant feature value distributions and adds them to the false positive candidate samples. For example, if false positive candidate curator 150 identifies ten false positive candidate samples from labeled corpus 110, false positive candidate curator 150 may obtain more false positive candidate samples from unlabeled corpus 160 if required.

False positive candidate curator 150 sends the false positive candidate samples to rules generator 170. Rules generator 170, in turn, generates mitigation rules 180 based on the false positive candidate samples. For example, assuming Fa has been identified as a dominant feature with distribution values between 0.55 and 0.7, and a large proportion of clean samples for which feature Fa sits within [0.55,0.7] AI model 120 scores as dirty, then rules generator 170 may issue a rule such as "if model(sample)>threshold and Fa(sample)>0.55 and Fa(sample)<0.7: treat_as: 'clean'."

Preemptive false positive mitigation system 105 then sends mitigation rules 180 to customer environment 190 to mitigate future customer false positives. For example, customer environment 190 may operate an AI model in listening mode and, when the AI model detects a dirty file, customer environment 190 applies mitigation rules 180 to the detected dirty file to determine whether the dirty file should be marked as clean. As another example, customer environment 190 may apply mitigation rules 180 to a file prior to providing the file to the AI model in listening mode to determine beforehand whether the file is clean.

Figure 2:
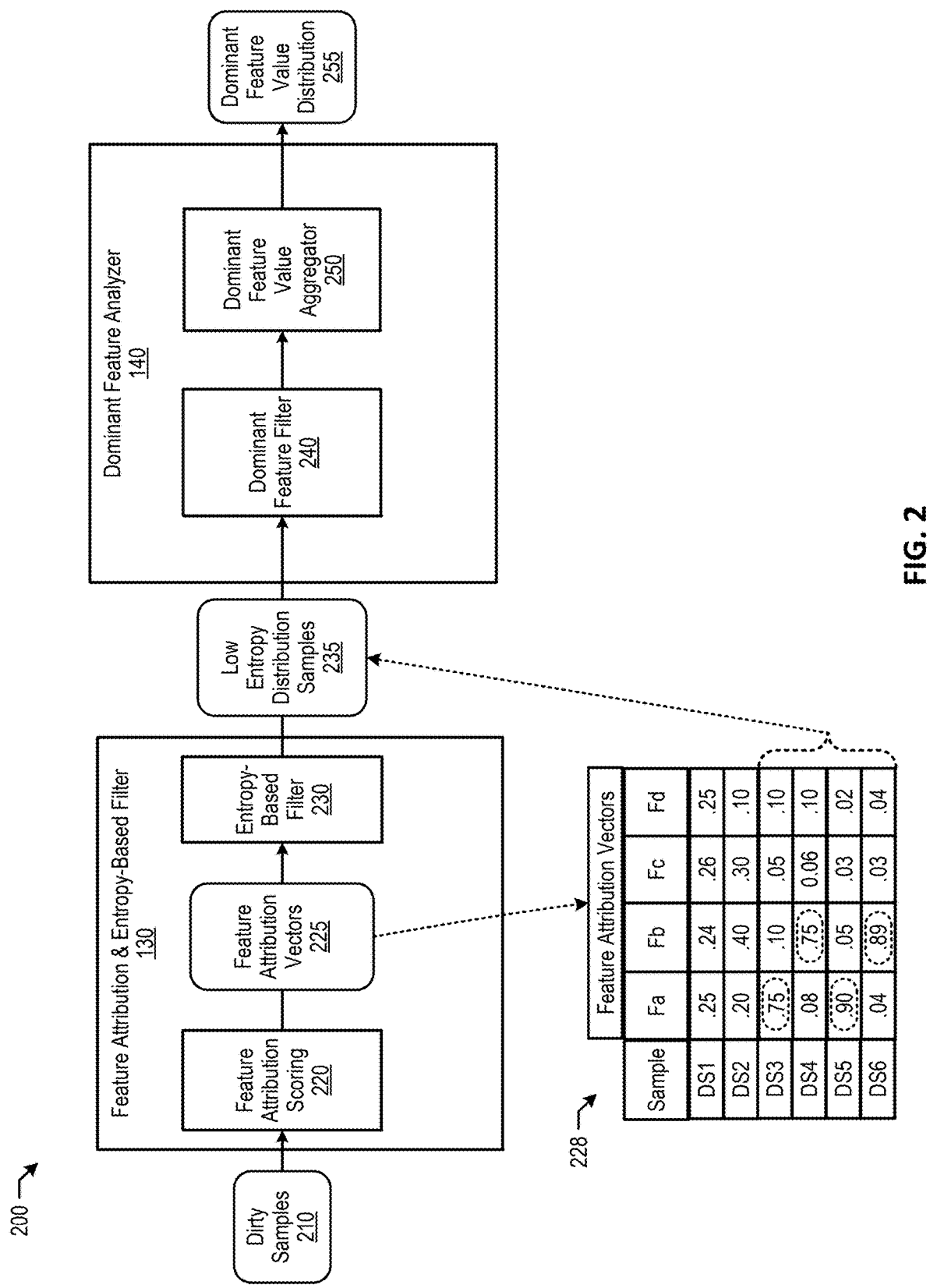
FIG. 2 is a block diagram that illustrates an example subsystem of an entropy-based preemptive false positive mitigation system, in accordance with some embodiments of the present disclosure.

FIG. 2 is a block diagram that illustrates an example subsystem of an entropy-based preemptive false positive mitigation system, in accordance with some embodiments of the present disclosure. Subsystem 200 includes feature attribution and entropy-based filter 130 and dominant feature analyzer 140 from FIG. 1.

Feature attribution and entropy-based filter 130 receives dirty samples from AI model 120 (FIG. 1). Feature attribution scoring 220 scores dirty samples 210 to produce feature attribution vectors 225 (e.g., Shapley vectors). Table 228 is a simple example of feature attribution vectors 225. Table 2280 shows feature attribution vectors for dirty samples DS1-DS6, and each feature attribution vector includes feature attribution values for features Fa, Fb, Fc, and Fd. Entropy-based filter 230 evaluates feature attribution vectors 225 and identifies low entropy distribution samples 235. Table 228 shows that samples DS3-6 are low entropy distribution samples because each sample includes a high feature attribution value relative to the other feature attribution values in the same vector.

Dominant feature analyzer 140 includes dominant feature filter 240, which analyzes low entropy distribution samples 235 to find features that consistently represent a dominant value in the distribution across the low entropy distribution samples 235. Then, dominant feature value aggregator 250 aggregates the feature value vectors (produced by parser 115) in low entropy distribution samples 235 to produce the dominant feature value distributions 255. For example, if sample DS1 has a feature value of 0.7 for feature Fa, and sample DS2 has a feature value of 0.55 for feature Fa, then the dominate feature value distribution for feature Fa is 0.55-0.7.

Figure 3:
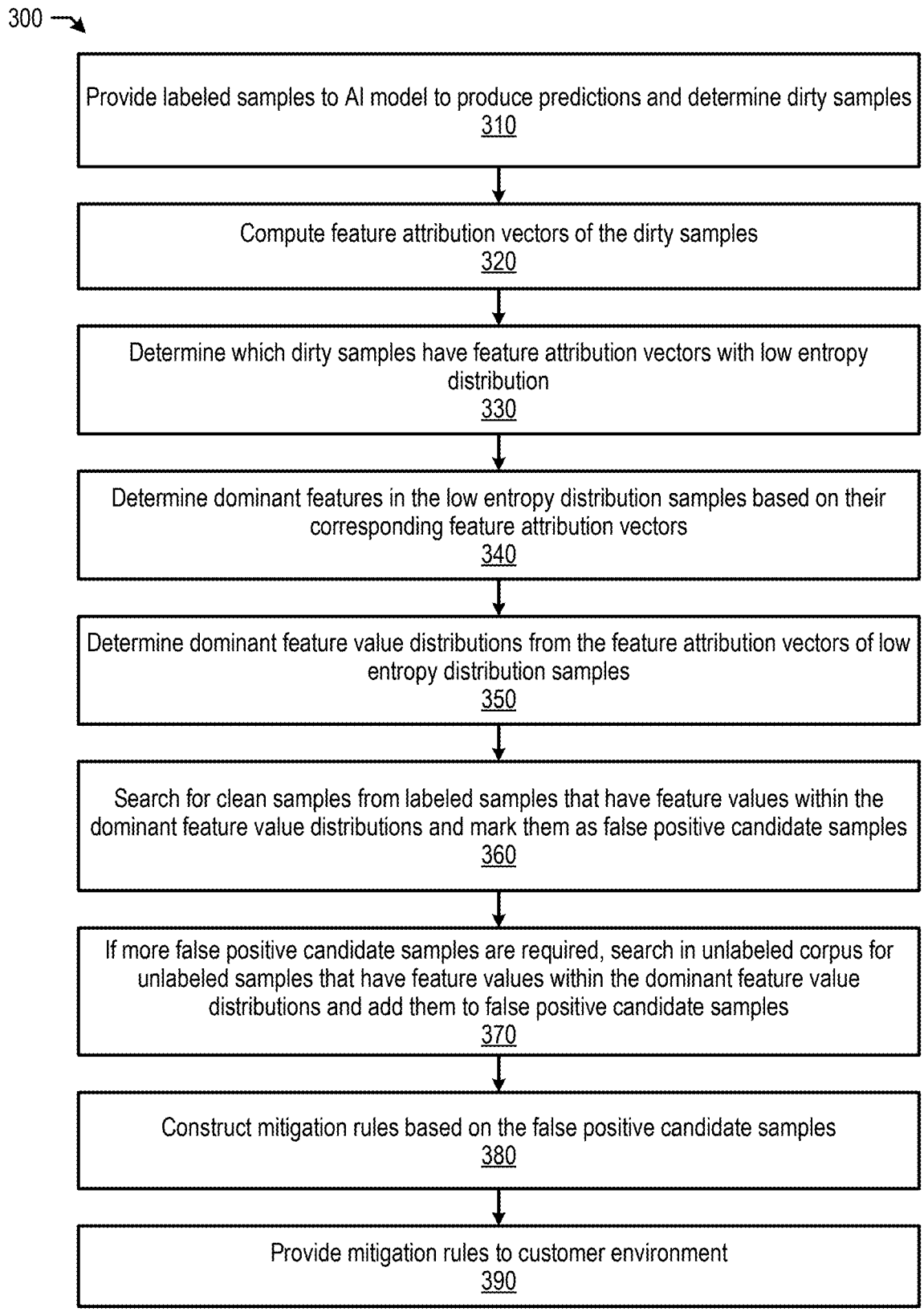
FIG. 3 is a flow diagram of a method for an entropy-based preemptive false positive mitigation system, in accordance with some embodiments.

FIG. 3 is a flow diagram of a method 300 for an entropy-based preemptive false positive mitigation system, in accordance with some embodiments.

Method 300 may be performed by processing logic that may include hardware (e.g., a processing device), software (e.g., instructions running/executing on a processing device), firmware (e.g., microcode), or a combination thereof. In some embodiments, at least a portion of method 400 may be performed by system 100 (shown in FIG. 1), processing device 510 (shown in FIG. 5), processing device 602 (shown in FIG. 6), or a combination thereof.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

With reference to FIG. 3, method 300 begins at block 310, whereupon processing logic provides a labeled corpus (labeled samples) to AI model 120 (via parser 115) to produce predictions and determine dirty samples. In one embodiment, a dirty sample may be determined by AI model 120 to be a sample that includes malware or other forms of malicious content, posing a threat to system integrity and security.

At block 320, processing logic computes feature attribution vectors of the dirty samples. In one embodiment, the feature attribution vectors are Shapley vectors that include Shapely values. As discussed above, Shapley vectors, derived from Shapley values in cooperative game theory, are used to fairly attribute the contribution of each feature in AI model 120's prediction. Shapley values distribute the total gain generated by the coalition of all players (features) fairly. In the context of machine learning, a Shapley vector represents the impact of each feature on a particular prediction by calculating the average marginal contribution of that feature across all possible combinations of features.

At block 330, processing logic determines which dirty samples have feature attribution vectors with low entropy distribution. A low entropy distribution sample is one in which the distribution of feature attribution values is concentrated, indicating that a single feature predominantly influenced the AI model 120's decision.

At block 340, processing logic determines dominant features in the low entropy distribution samples based on their corresponding feature attribution vectors. For example, a feature attribution vector may include scores of Fa:0.7, Fb:0.1, Fc:0.1, and Fd:0.1. In this example, Fa is the dominant feature.

At block 350, processing logic determines dominant feature value distributions of the dominant features in the low entropy distribution samples. In one embodiment, processing logic aggregates the feature value vectors corresponding to the low entropy distribution samples to produce the dominant feature value distributions. For example, if sample S1 has a feature value of 0.7 for feature Fa, and sample S2 has a feature value of 0.55 for feature Fa, then the dominate feature value distribution for feature Fa is 0.55-0.7.

At block 360, processing logic searches for clean samples from the labeled samples that have feature values within the dominant feature value distribution and mark them as false positive candidate samples. Continuing the example above, if a clean sample has a feature value for feature Fa between 0.55-0.7, then processing logic marks the clean sample as a false positive candidate sample.

At block 370, if more false positive candidate samples are required, processing logic searches in unlabeled corpus 160 for unlabeled samples that have feature values within the dominant feature value distributions and adds them to the false positive candidate samples. For example, if block 360 identifies ten false positive candidate samples, processing logic may obtain more false positive candidate samples from unlabeled corpus 160 shown in FIG. 1.

At block 380, processing logic constructs mitigation rules based on the false positive candidate samples and, at block 390, processing logic provides the mitigation rules to customer environment 190.

Figure 4:
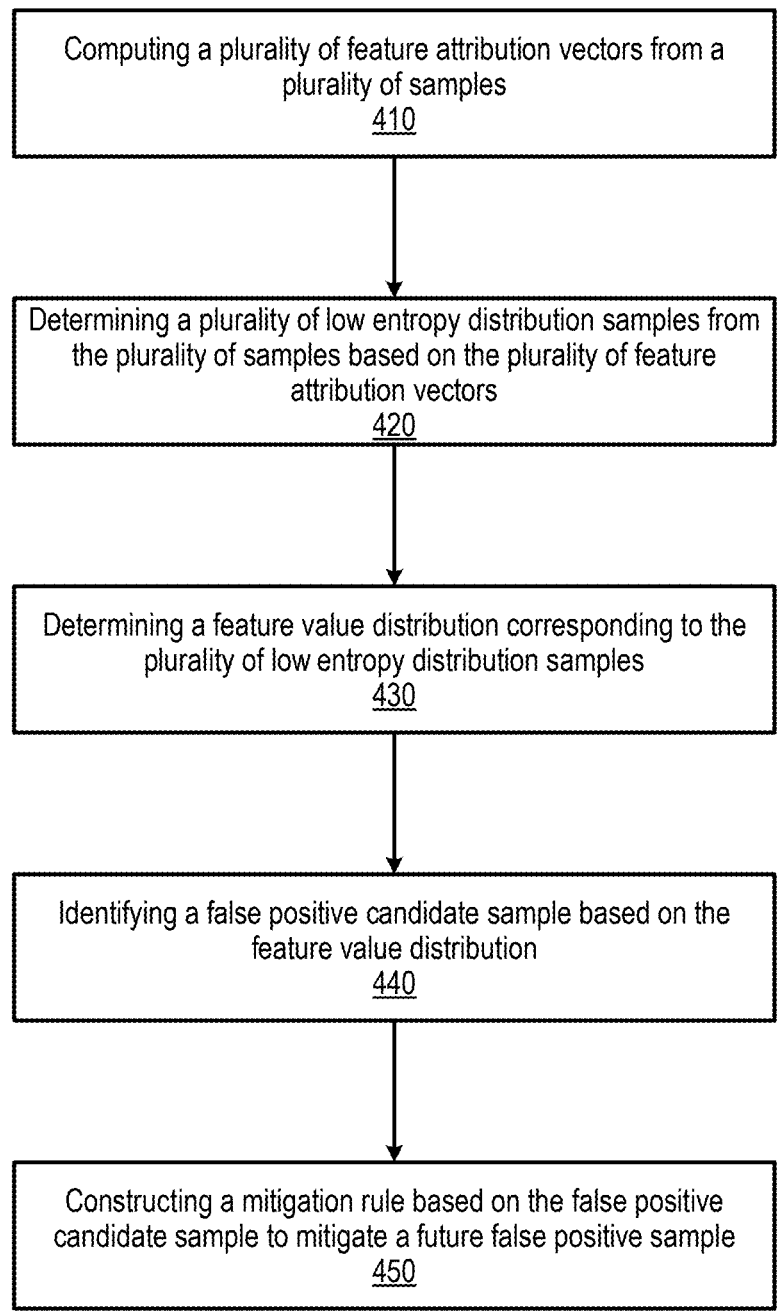
FIG. 4 is a flow diagram of a method for an entropy-based preemptive false positive mitigation system, in accordance with some embodiments.

FIG. 4 is a flow diagram of a method 400 for an entropy-based preemptive false positive mitigation system, in accordance with some embodiments.

Method 400 may be performed by processing logic that may include hardware (e.g., a processing device), software (e.g., instructions running/executing on a processing device), firmware (e.g., microcode), or a combination thereof. In some embodiments, at least a portion of method 400 may be performed by system 100 (shown in FIG. 1), processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, whereupon processing logic computes a plurality of feature attribution vectors from a plurality of samples. In one embodiment, processing logic inputs a plurality of labeled samples into an artificial intelligence (AI) model to produce a prediction for each of the plurality of labeled samples. Processing logic filters the plurality of labeled samples based on their corresponding prediction to produce a plurality of dirty samples that are used to compute the plurality of feature attribution vectors. In one embodiment, the plurality of feature attribution vectors are Shapely vectors that include Shapley values.

At block 420, processing logic determines a plurality of low entropy distribution samples from the plurality of samples based on the plurality of feature attribution vectors. In one embodiment, a low entropy distribution sample is one in which the distribution of feature attribution values is concentrated, indicating that a single feature predominantly influenced the AI model 120's decision.

At block 430, processing logic determines a feature value distribution corresponding to the plurality of low entropy distribution samples. In one embodiment, processing logic determines a dominant feature based on the plurality of feature attribution vectors that correspond to the plurality of the low entropy distribution samples. Processing logic then aggregates the plurality of feature attribution vectors that correspond to the plurality of the low entropy distribution samples to produce a "dominant" feature value distribution that corresponds to the dominant feature, which is used as the feature value distribution.

At block 440, processing logic identifies a false positive candidate sample based on the feature value distribution. In one embodiment, processing logic parses a plurality of labeled samples to produce a plurality of labeled sample feature vectors, and then filters the plurality of labeled sample feature vectors based on the dominant feature value distribution. Processing logic then selects the false positive candidate sample based upon the filtering. In one embodiment, processing logic determines whether additional false positive candidate samples are required. In response to determining that the additional false positive candidate samples are required, processing logic parses a plurality of unlabeled samples to produce a plurality of unlabeled sample feature vectors. Processing logic filters the plurality of unlabeled sample feature vectors based on the dominant feature value distribution, and selects the additional false positive candidate samples based upon the filtering. In turn, processing logic constructs the mitigation rule based on the false positive candidate sample and the additional false positive candidate samples. In one embodiment, one of the plurality of labeled sample feature vectors corresponding to the false positive candidate sample includes a feature value within the dominant feature value distribution.

At block 450, processing logic constructs a mitigation rule based on the false positive candidate sample. In one embodiment, processing logic provides the mitigation rule to a customer system to mitigate the future false positive sample at the customer system.

Figure 5:
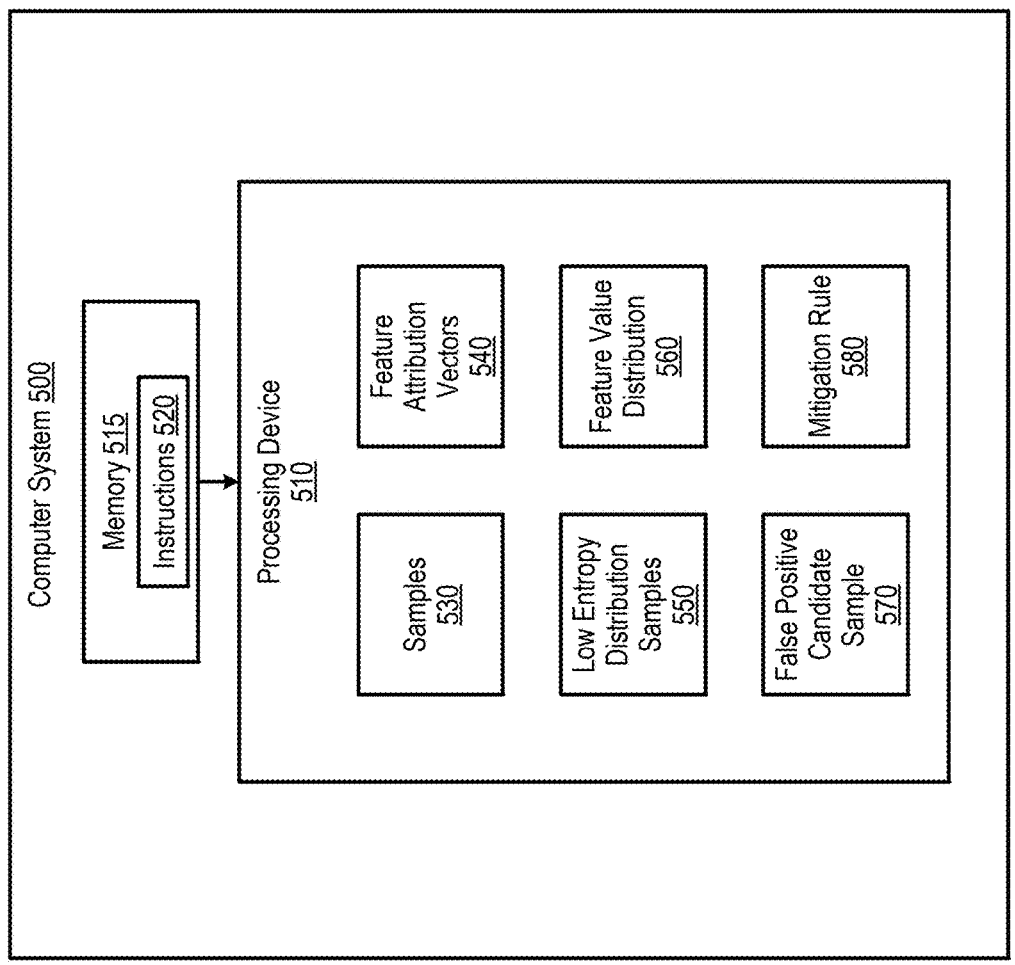
FIG. 5 is a block diagram that illustrates an example system for an entropy-based preemptive false positive mitigation system, in accordance with some embodiments of the present disclosure.

FIG. 5 is a block diagram that illustrates an example system for an entropy-based preemptive false positive mitigation system, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to compute a plurality of feature attribution vectors 540 from a plurality of samples 530. Processing device 510 determine a plurality of low entropy distribution samples 550 from the plurality of samples 530 based on the plurality of feature attribution vectors 540; Processing device 510 determine a feature value distribution 560 corresponding to the plurality of low entropy distribution samples 550; Processing device 510 identify a false positive candidate sample 570 based on the feature value distribution 560. In turn, processing device 510 constructs a mitigation rule 580 based on the false positive candidate sample 570 to mitigate a future false positive sample, such as at customer environment 190 shown in FIG. 1.

Figure 6:
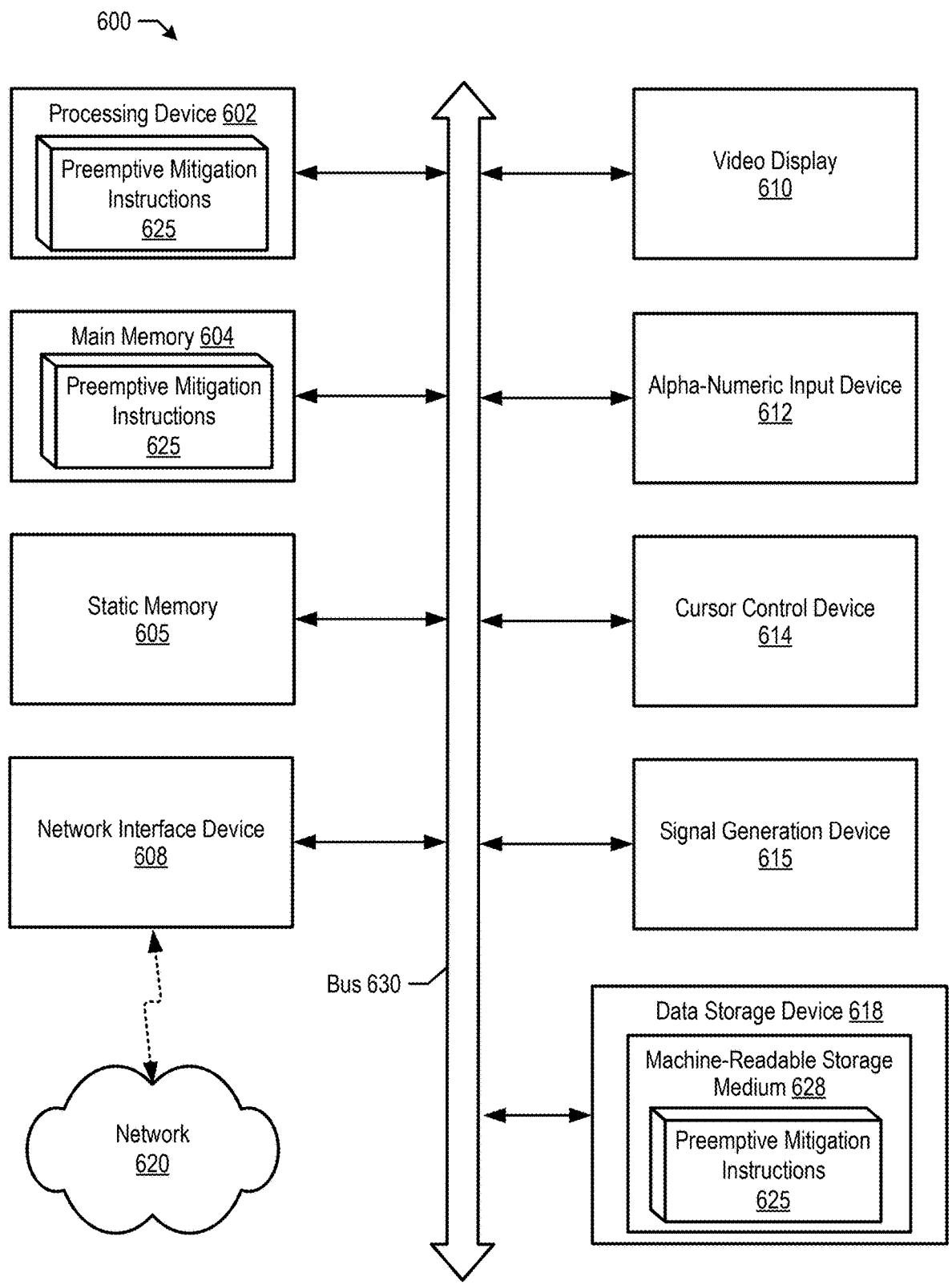
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for an entropy-based preemptive false positive mitigation system.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute preemptive mitigation instructions 625, for performing the operations and steps discussed herein.

The data storage device 618 may include a machine-readable storage medium 628, on which is stored one or more sets of preemptive mitigation instructions 625 (e.g., software) embodying any one or more of the methodologies of functions described herein. The preemptive mitigation instructions 625 may also reside, completely or at least partially, within the main memory 604 or within the processing device 602 during execution thereof by the computer system 600; the main memory 604 and the processing device 602 also constituting machine-readable storage media. The preemptive mitigation instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "computing," "determining," "identifying," "constructing," "aggregating," "parsing," "filtering," "selecting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
   computing a plurality of feature attribution vectors from a plurality of samples;
   determining, by a processing device, a plurality of low entropy distribution samples from the plurality of samples based on the plurality of feature attribution vectors;
   determining a feature value distribution corresponding to the plurality of low entropy distribution samples;
   identifying a false positive candidate sample based on the feature value distribution; and
   constructing a mitigation rule, based on the false positive candidate sample, wherein constructing the mitigation rule further comprises:
      determining whether additional false positive candidate samples are required;
      in response to determining that the additional false positive candidate samples are required:
         parsing a plurality of unlabeled samples to produce a plurality of unlabeled sample feature vectors;
         filtering the plurality of unlabeled sample feature vectors based on a dominant feature value distribution;
         selecting the additional false positive candidate samples based upon the filtering;
      constructing the mitigation rule based on the false positive candidate sample and the additional false positive candidate samples; and
      transmitting the mitigation rule to a computer system to mitigate a future false positive sample.

2. The method of claim 1, further comprising:
   determining a dominant feature based on the plurality of feature attribution vectors that correspond to the plurality of the low entropy distribution samples; and
   aggregating the plurality of feature attribution vectors that correspond to the plurality of the low entropy distribution samples to produce the dominant feature value distribution that corresponds to the dominant feature, wherein the dominant feature value distribution is the feature value distribution.

3. The method of claim 2, further comprising:
   parsing a plurality of labeled samples to produce a plurality of labeled sample feature vectors;
   filtering the plurality of labeled sample feature vectors based on the dominant feature value distribution; and
   selecting the false positive candidate sample based upon the filtering.

4. The method of claim 3, wherein one of the plurality of labeled sample feature vectors corresponding to the false positive candidate sample comprises a feature value within the dominant feature value distribution.

5. The method of claim 1, wherein the plurality of samples are a plurality of dirty samples, the method further comprising:
   providing a plurality of labeled samples to an artificial intelligence (AI) model to produce a prediction for each of the plurality of labeled samples; and
   filtering the plurality of labeled samples based on their corresponding prediction to produce the plurality of dirty samples.

6. The method of claim 1, wherein the plurality of feature attribution vectors are Shapely vectors comprising a plurality of Shapley values.

7. The method of claim 1, further comprising:
   providing the mitigation rule to a customer system to mitigate the future false positive sample at the customer system.

8. A system comprising:
   a memory; and
   a processing device, operatively coupled to the memory, to:
      compute a plurality of feature attribution vectors from a plurality of samples;
      determine a plurality of low entropy distribution samples from the plurality of samples based on the plurality of feature attribution vectors;
      determine a feature value distribution corresponding to the plurality of low entropy distribution samples;
      identify a false positive candidate sample based on the feature value distribution; and
      construct a mitigation rule, based on the false positive candidate sample, wherein to construct the mitigation rule, the processing device to:
         determine whether additional false positive candidate samples are required;
         in response to determine that the additional false positive candidate samples are required:
            parse a plurality of unlabeled samples to produce a plurality of unlabeled sample feature vectors;
            filter the plurality of unlabeled sample feature vectors based on a dominant feature value distribution;

select the additional false positive candidate samples based upon the filtering;

construct the mitigation rule based on the false positive candidate sample and the additional false positive candidate samples; and transmit the mitigation rule to a computer system to mitigate a future false positive sample.

9. The system of claim 8, wherein the processing device is further to:

determine a dominant feature based on the plurality of feature attribution vectors that correspond to the plurality of the low entropy distribution samples; and aggregate the plurality of feature attribution vectors that correspond to the plurality of the low entropy distribution samples to produce the dominant feature value distribution that corresponds to the dominant feature, wherein the dominant feature value distribution is the feature value distribution.

10. The system of claim 9, wherein the processing device is further to:

parse a plurality of labeled samples to produce a plurality of labeled sample feature vectors;

filter the plurality of labeled sample feature vectors based on the dominant feature value distribution; and select the false positive candidate sample based upon the filtering.

11. The system of claim 10, wherein one of the plurality of labeled sample feature vectors corresponding to the false positive candidate sample comprises a feature value within the dominant feature value distribution.

12. The system of claim 8, wherein the plurality of samples are a plurality of dirty samples, and wherein the processing device is further to:

provide a plurality of labeled samples to an artificial intelligence (AI) model to produce a prediction for each of the plurality of labeled samples; and filter the plurality of labeled samples based on their corresponding prediction to produce the plurality of dirty samples.

13. The system of claim 8, wherein the plurality of feature attribution vectors are Shapely vectors comprising a plurality of Shapley values.

14. The system of claim 8, wherein the processing device is further to:

provide the mitigation rule to a customer system to mitigate the future false positive sample at the customer system.

15. A non-transitory computer readable medium, storing instructions that, when executed by a processing device, cause the processing device to:

compute a plurality of feature attribution vectors from a plurality of samples;

determine, by the processing device, a plurality of low entropy distribution samples from the plurality of samples based on the plurality of feature attribution vectors;

determine a feature value distribution corresponding to the plurality of low entropy distribution samples;

identify a false positive candidate sample based on the feature value distribution; and construct a mitigation rule, based on the false positive candidate sample, wherein to construct the mitigation rule, the processing device to:

determine whether additional false positive candidate samples are required;

in response to determine that the additional false positive candidate samples are required:

parse a plurality of unlabeled samples to produce a plurality of unlabeled sample feature vectors:

filter the plurality of unlabeled sample feature vectors based on a dominant feature value distribution;

select the additional false positive candidate samples based upon the filtering;

construct the mitigation rule based on the false positive candidate sample and the additional false positive candidate samples; and transmit the mitigation rule to a computer system to mitigate a future false positive sample.

16. The non-transitory computer readable medium of claim 15, wherein the processing device is further to:

determine a dominant feature based on the plurality of feature attribution vectors that correspond to the plurality of the low entropy distribution samples; and aggregate the plurality of feature attribution vectors that correspond to the plurality of the low entropy distribution samples to produce the dominant feature value distribution that corresponds to the dominant feature, wherein the dominant feature value distribution is the feature value distribution.

17. The non-transitory computer readable medium of claim 16, wherein the processing device is further to:

parse a plurality of labeled samples to produce a plurality of labeled sample feature vectors;

filter the plurality of labeled sample feature vectors based on the dominant feature value distribution; and select the false positive candidate sample based upon the filtering.

18. The non-transitory computer readable medium of claim 17, wherein one of the plurality of labeled sample feature vectors corresponding to the false positive candidate sample comprises a feature value within the dominant feature value distribution.

* * * * *